(12) United States Patent
Müller et al.

(10) Patent No.: US 9,316,262 B2
(45) Date of Patent: Apr. 19, 2016

(54) LINEAR BRAKE OPERATED BY MEANS OF EXTERNAL ENERGY

(71) Applicant: CHR. MAYR GMBH + CO. KG, Mauerstetten (DE)

(72) Inventors: Alexander Müller, Kaufbeuren (DE); Martin Hecht, Kaufbeuren (DE); Christoph Dropmann, Kaufbeuren (DE)

(73) Assignee: CHR. MAYR GMBH + CO. KG, Mauerstetten (DE)

( * ) Notice: Subject to any disclaimer, the term of this patent is extended or adjusted under 35 U.S.C. 154(b) by 0 days.

(21) Appl. No.: 14/433,807

(22) PCT Filed: Dec. 16, 2013

(86) PCT No.: PCT/EP2013/076679
§ 371 (c)(1),
(2) Date: Apr. 6, 2015

(87) PCT Pub. No.: WO2014/095706
PCT Pub. Date: Jun. 26, 2014

(65) Prior Publication Data
US 2015/0275977 A1    Oct. 1, 2015

(30) Foreign Application Priority Data

Dec. 21, 2012   (DE) .......................... 10 2012 025 438

(51) Int. Cl.
*F16D 55/08*     (2006.01)
*F16C 41/00*     (2006.01)
(Continued)

(52) U.S. Cl.
CPC ............. *F16C 41/001* (2013.01); *F16C 29/126* (2013.01); *F16D 63/008* (2013.01); *F16D 2121/06* (2013.01); *F16D 2121/12* (2013.01); *F16D 2125/66* (2013.01)

(58) Field of Classification Search
CPC ......... F16D 65/14; F16D 65/18; F16D 65/32; F16D 63/008; F16D 2125/66; F16D 2127/04; B60T 13/04; F16C 29/126; F16C 41/001

USPC .................................. 188/44, 67, 161, 106 R
See application file for complete search history.

(56) References Cited

U.S. PATENT DOCUMENTS 5,732,799 A * 3/1998 Chikamatsu ............. B23Q 1/28
                                                           188/67
6,802,402 B2 * 10/2004 Bausch ................... B60T 13/04
                                                           188/161
(Continued)

FOREIGN PATENT DOCUMENTS

DE    19745342 A1    4/1998
DE    10127664 C1    4/2003
(Continued)

OTHER PUBLICATIONS

English Translation of International Preliminary Report on Patentability from corresponding PCT application No. PCT/EP2013/076679, issued Jun. 23, 2015, 5 pgs.
(Continued)

*Primary Examiner* — Christopher Schwartz
(74) *Attorney, Agent, or Firm* — Chernoff, Vilhauer, McClung & Stenzel, LLP

(57) ABSTRACT

The invention relates to a linear brake (LBR) for attachment on a slide that can be moved along a guide rail (F), having a brake housing (1), which at least partially surrounds the guide rail (F), a force store arranged on or in the brake housing (1) and a brake piston (3), which is loaded by the force store, surrounds the guide rail (F) in a fork-like manner and is moved by the force store against the guide rail transversely to the movement direction between the slide and the guide rail (F). The brake piston presses the two clamp jaws (7), which are connected with a U-shaped transfer plate (6), against the guide rail (F) by means of piston bevels (3.2) and wedge bevels (5.1), which are arranged on both sides of the guide rail (F) and are opposite each other. The brake piston (3) is configured as a cylindrical annular piston, which is loaded on one end face by the force store (2) arranged centrally in the annular piston and has on the other end face the piston ends (3.6) with the bevel faces (3.2). A piston space (3.5) is formed in an annular manner and on the radial outer side of the cylindrical annular piston (3) in the region of the join (1.4) between the annular piston and the housing body (1.1), wherein a piston ring (8) connected radially on the outside to the annular piston delimits the piston space (3.5) at the end face.

12 Claims, 6 Drawing Sheets

Figure 1:
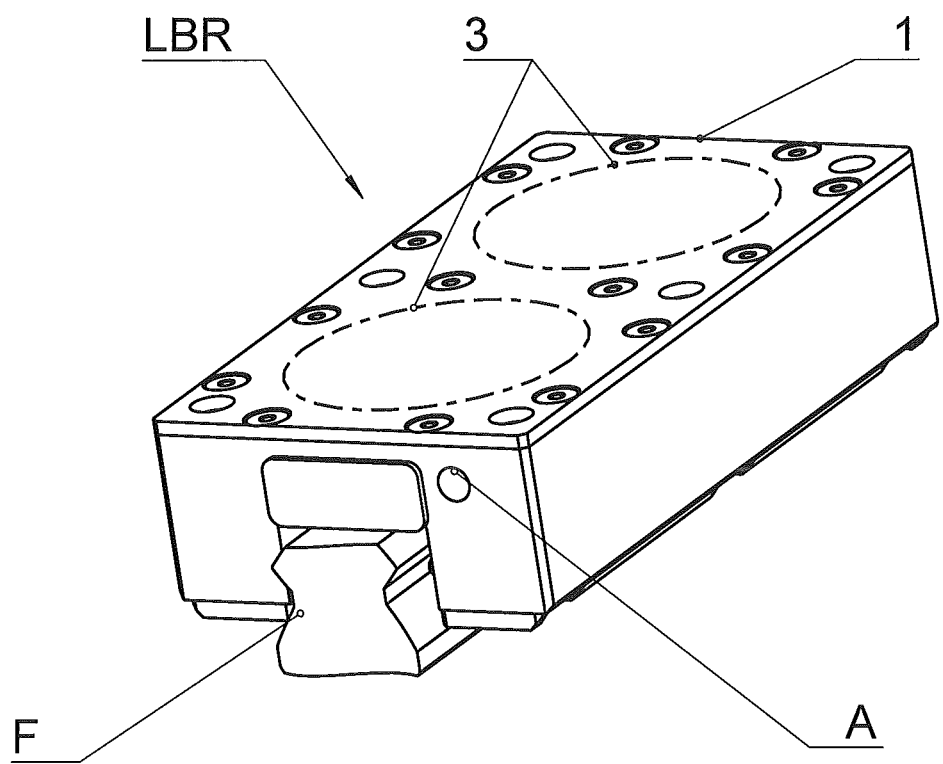

(51) Int. Cl.
  *F16D 63/00* (2006.01)
  *F16C 29/12* (2006.01)
  *F16D 121/12* (2012.01)
  *F16D 125/66* (2012.01)
  *F16D 121/06* (2012.01)

(56) References Cited

U.S. PATENT DOCUMENTS

| | | | | |
|---|---|---|---|---|
| 8,061,488 | B2 * | 11/2011 | Hofmann | F16D 63/00 188/106 R |
| 8,220,592 | B2 * | 7/2012 | Hein | F15B 15/262 188/44 |
| 2005/0199451 | A1 * | 9/2005 | Zimmer | B23Q 1/28 188/67 |
| 2010/0065383 | A1 | 3/2010 | Hein et al. | |

FOREIGN PATENT DOCUMENTS

| | | |
|---|---|---|
| DE | 10225353 A1 | 12/2003 |
| DE | 10260274 A1 | 7/2004 |
| DE | 102005016724 A1 | 10/2006 |
| DE | 102006019410 A1 | 10/2007 |
| DE | 102006062295 A1 | 7/2008 |
| DE | 102009036978 A1 | 2/2011 |

OTHER PUBLICATIONS

International search report from corresponding PCT application No. PCT/EP2013/076679, mailed Apr. 1, 2014, 6 pgs., with English translation.

Search report from corresponding German patent application No. 10 2012 025 438.5, mailed Feb. 26, 2013, 5 pgs., no translation available.

* cited by examiner

Detail A

Detail B

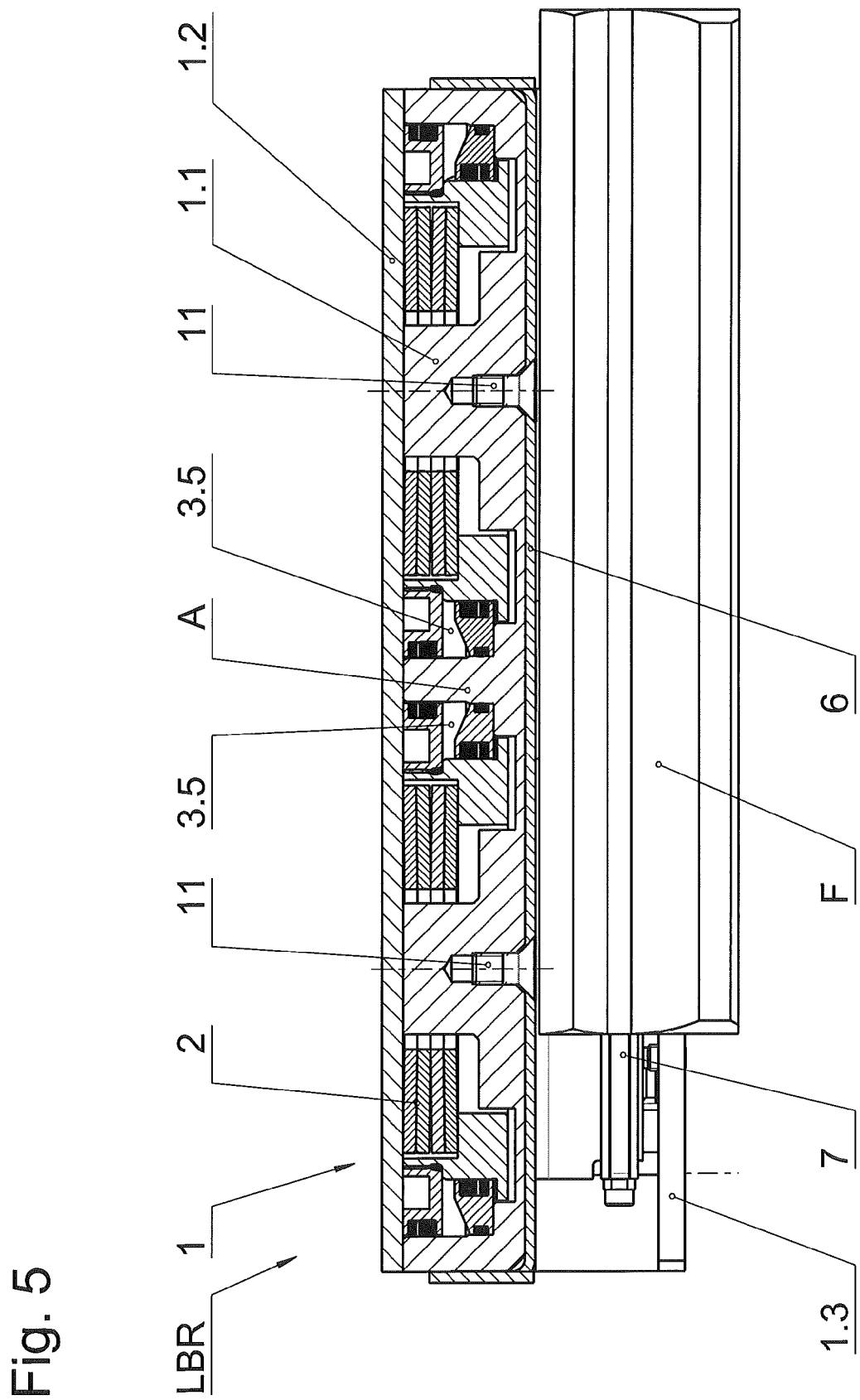

LINEAR BRAKE OPERATED BY MEANS OF EXTERNAL ENERGY

CROSS-REFERENCE TO RELATED APPLICATIONS

This is a national stage application filed under 35 USC 371 based on International Application No. PCT/EP2013/076679 filed Dec. 16, 2013 and claims priority under 35 USC 119 of German Patent Application No. 10 2012 025 438.5 filed Dec. 21, 2012.

The following invention relates to a linear brake releasable through the introduction of external energy in the form of compressed air or hydraulic oil for installation on a slide running parallel to a guide rail, namely according to the preamble of the main claim. It is envisaged that the housing of the linear brake at least partially surrounds the guide rail and that one or more actuator elements are arranged within the housing of the linear brake, which actuator elements cooperate with force stores and are actuated by the introduction of external energy to effect or release a clamping action of the linear brake on the guide rail.

As disclosed in DE 101 27 664 C1 brakes for guide rails customary in the trade are known from the state of the art. Therein is described how, by way of a spring pre-loaded fork-shaped magnetic anchor, two wedge elements are arranged edgewise to the guide rail and opposing each other such that these are pressed together in a direction perpendicular to the direction of movement of the guide rail and thereby apply a clamping force to the guide rail.

Release of the clamping is accomplished by way of an electromagnetic arrangement whereby the magnetic anchor pulls against the force of the spring elements and thereby releases the clamping between the wedge elements and the guide rail.

A disadvantage of the described brake is its limited power density, that is to say a limited achievable clamping force per unit volume of the brake. This is caused by way of actuation through the electromagnetic arrangement with its limited achievable forces onto the magnetic anchor.

A further brake for guide rails is known from DE 10 2006 062 295 B4. This document shows a clamping system for installation on a slide movable parallel to a guide rail, wherein clamping onto the guide rail is actively achieved by way of the clamping elements being driven by energy introduced from outside; a fork-shaped clamping element is movable vertically to the direction of movement of the slide/the brake and creates the contact with the surface of the guide rail via the prism-shaped symmetrical internal geometry of said clamping element.

The disadvantage of this known construction is the fact that clamping action is only maintained while external energy is being delivered and fails when the power is cut.

Further, the direct contact between the movable fork-shaped clamping element of the brake and the guide rail leads to high wear at the contact surfaces between the clamping element and the guide rail and also to reaction forces on the brake which stresses the guidance of the slide connected with the brake on the guide rail.

Further known is the braking and clamping system according to DE 10 2006 019 410 A1 with partly wedge-shaped actuation lobes, whereby the clamping arrangement is part of a slide run on rails and two friction jaws which press from each side of the track and whereby the spring preloading and the wedge-shaped sections of the actuation lobes press these into the clamping position whilst application of compressed air/hydraulic oil on the actuation lobes against the spring preloading causes the brake to be released. Disadvantageous in this implementation is, in particular, the essentially right-angled nature of the design of the actuation lobes which leads to production difficulties and to stability problems with regard to the rigidity of the housing of the braking and/or clamping system.

In the clamping arrangement of DE 10 2006 019 410 A1 the clamping force is achieved through the elastic springiness of the housing, which is bent open elastically when the brake is opened by application onto the brake of pressurizing media. The limited stiffness of the housing is disadvantageous with respect to the achievable clamping forces. A further disadvantage is the limited elastic travel of the housing.

The objective of the present invention is to propose a technical improvement to the state of the art which, with the smallest construction size possible, allows an increase of the housing stability and of the achievable braking force acting on the guide rail. Moreover, the improvement is to be conceived such that the clamping force of the brake is created by an energy or force store integrated therewith, however, release is achieved through a power or force store which is unrelated to the brake housing and is achieved through the application of outside energy in the form of compressed air or oil hydraulic pressure (fail-safe principle). In this context, the friction surfaces of the friction shoes are to move without external reaction forces perpendicular to the friction surface of the guide rod and to be largely wear and maintenance free.

This objective is solved according to the features of the main claim.

The brake is equipped with a housing, which at least partly surrounds the guide rail and in which the force store is found. The force store supplies force at right angles to the direction of movement of the brake to one or more fork-shaped piston elements surrounding or straddling the guide rail, wherein the piston elements through appropriately dimensioned bevels, presses two wedge elements arranged to be opposing and on either side of the guide rail, onto the double-sided braking surface of the guide rail and thereby clamp the brake onto the guide rail.

In the inventive device described herein, the force store for closing the brake is conceived as a spring packet formed of plate springs (Belleville spring washers) and opening of the brake is achieved through a piston/cylinder arrangement activated through compressed air or hydraulic pressure of oil, which force acts against the force of the spring packet. Through this combination of strong spring elements and a piston/cylinder arrangement of high power density, the inventive linear brake herein described is in the position to achieve very high clamping forces from a limited physical size. In order to achieve these high clamping forces a brake housing of high stiffness is required, which is favored by the ring-formed design of the piston/cylinder arrangement.

In place of plate springs as the power store, all types of mechanical spring elements, piston/cylinder arrangements worked by pressurizing media or accumulators worked by pressurizing media are also envisaged and the opening of the brake can alternatively be through electric, electromagnetic or piezoelectric actuators.

In order to augment the efficiency of power transmission as well as to further increase the clamping forces, roller elements are conceived between the bevel surfaces of the fork-shaped piston and the brake shoes, however, a tribological pairing with materials having suitable friction properties is also possible in this place.

For a further increase of the achievable clamping force, several of the described clamping arrangements can be arranged within the brake housing along the direction of movement of the guide rail one behind another and operated together.

Additionally, the brake according to the invention for implementation with linear drives is also suitable for clamping rotating members provided that an appropriate braking surface is available.

Further specific advantages of the arrangement and mode of operation of the brake according to the invention are to be found in the dependent claims and also in the description of the following Figs.

Figure 2:
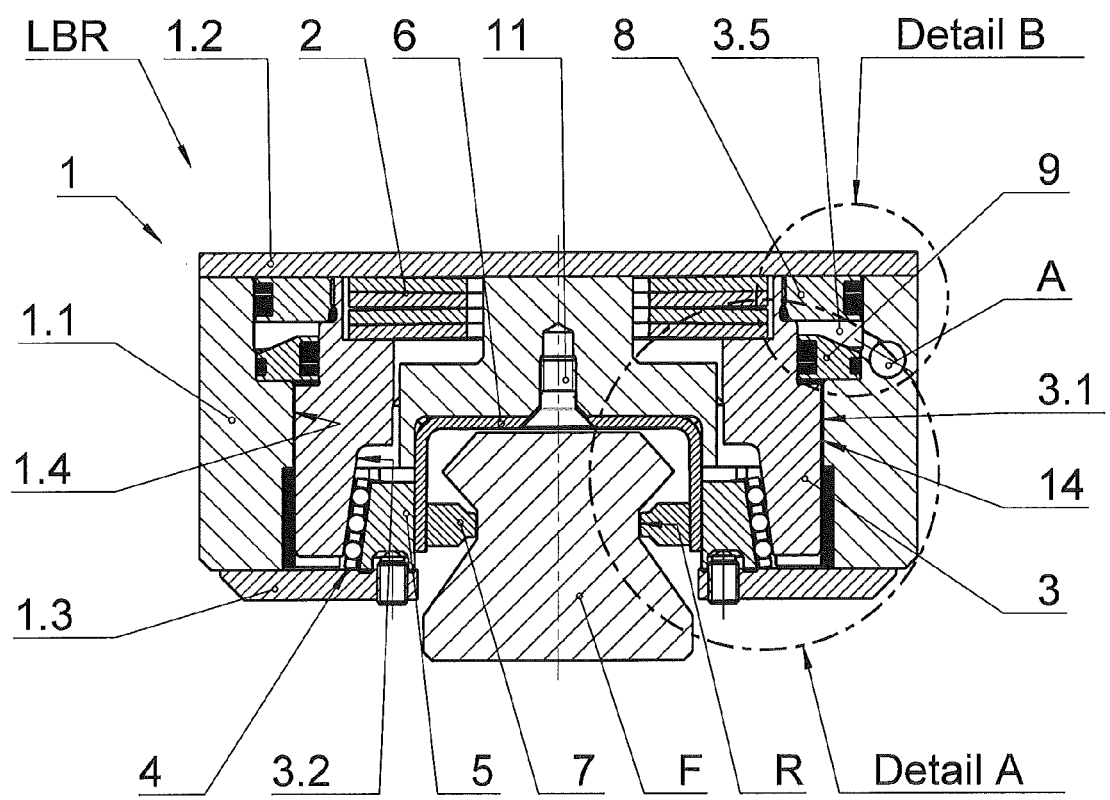
Figure 3:
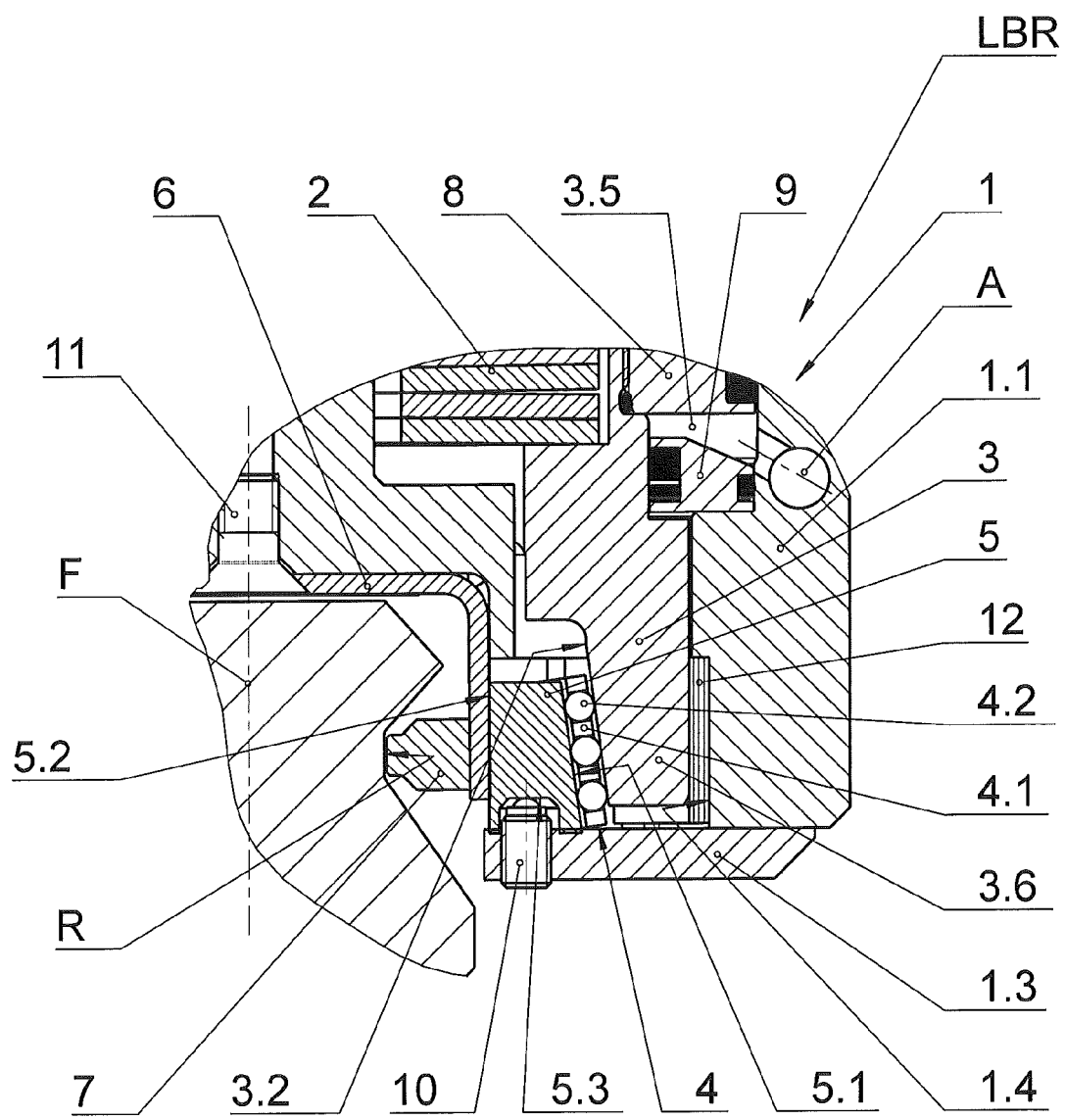
Figure 4:
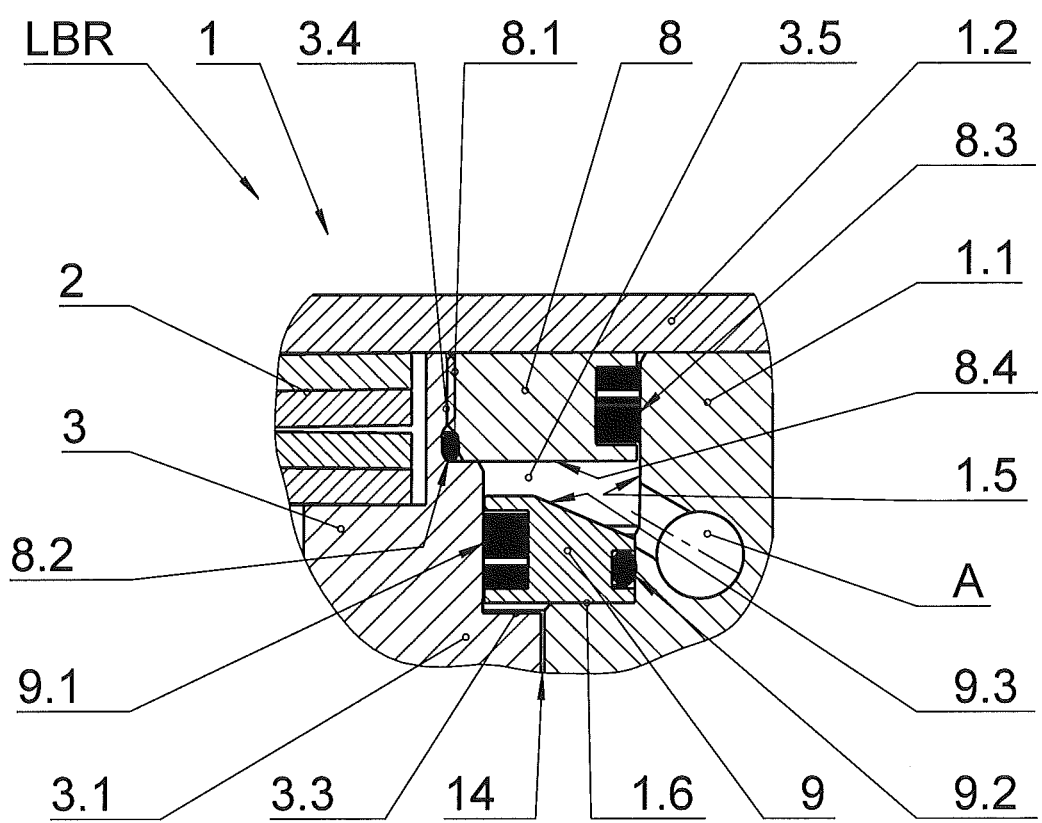

Herein is shown:

FIG. 1 the spatial representation of an outside view of the brake;

FIG. 2 a cross section through the brake element according to the invention;

FIG. 3 a detailed view of Detail A, from the cross section of FIG. 2 with an enlarged representation of the clamping area;

FIG. 4 a detailed view of Detail B, from the cross section of FIG. 2 with an enlarged view of the piston/cylinder arrangement;

FIG. 5 a longitudinal section through an embodiment of the linear brake having two brake entities according to the invention arranged in a row one behind the other.

Figure 6A:
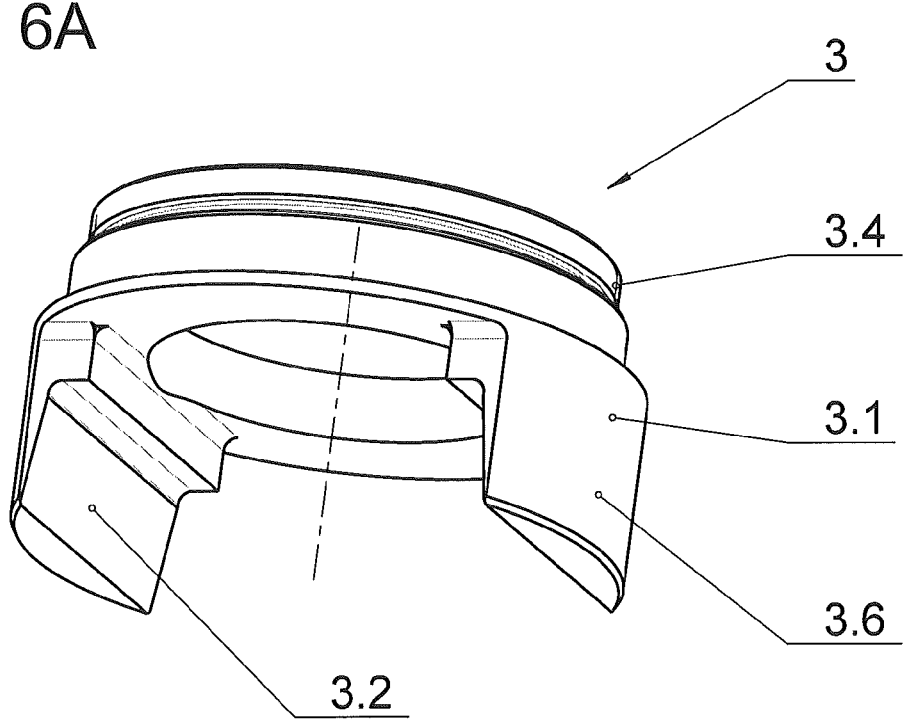
Figure 6B:
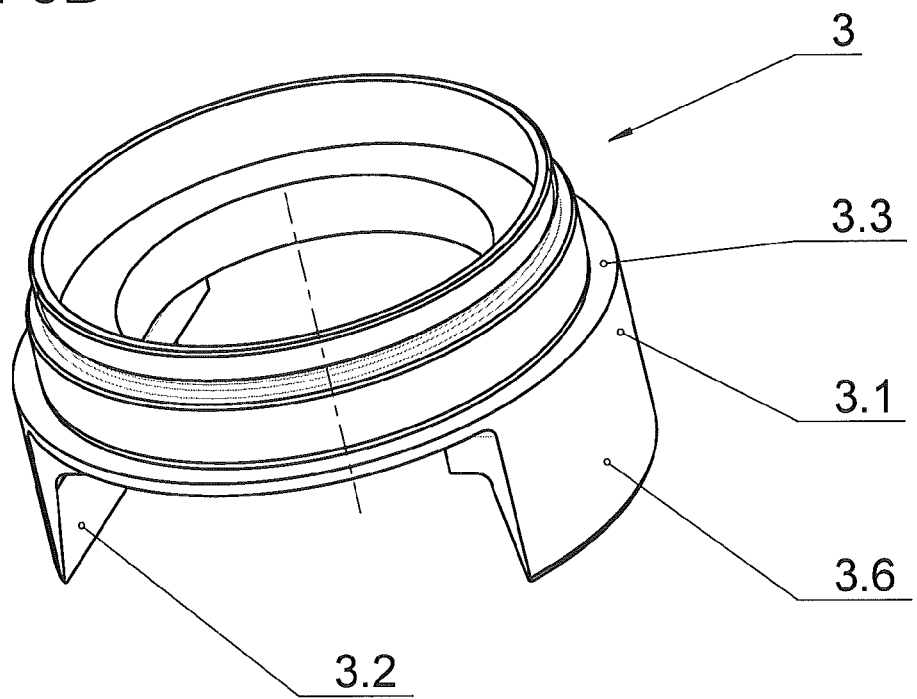

FIG. 6A, 6B two perspective views of the brake piston from diagonally underneath and from diagonally above.

FIG. 1 shows a perspective outside view of the linear brake (LBR) operated by way of outside energy according to the invention and comprising of the brake housing (1), partially surrounding the likewise represented guide rail (F). The delivery of external energy in the form of compressed air or hydraulic oil is provided to the linear brake (LBR) through a connection bore (A) on the brake housing (1) for connection to an external source of pressurizing medium.

FIG. 2 shows a cross section through the linear brake (LBR) according to the invention, namely perpendicular to the direction of movement of the linear brake (LBR) on the guide rail (F). In all figures, the brake piston (3) is shown in its top stop position. The piston ring (8) thereby lies on the inside edge of the housing lid (1.2) and the brake is released.

The largely symmetrical brake housing is composed of three parts, namely the housing body (1.1), the housing lid (1.2) and the housing base (1.3). In this brake housing is found a force store composed of spring elements, the force of which is supported on the one hand by the housing lid (1.2) and on the other hand presses the brake piston (3) (straddling the guide rail (F)), namely via the overall cylindrical piston skirt (3.1) which is guided in the housing bore (1.4). The fork-shaped piston ends (3.6) of the brake piston (3) can be seen particularly well in FIGS. 6A and 6B.

There are provided piston bevels (3.2) arranged on both symmetrical radial insides of both piston ends (3.6) through which the force of the spring elements (2) is intensified and deflected through 90° radially inwards. This affects a clamping of the linear brake (LBR) onto the guide rail (F) by way of the linear roller bearing (4), the transfer wedges (5), the transfer plate (6) and the clamping jaws (7) on the two opposed friction surfaces (R) of the guide rail (F).

In order to release the linear brake (LBR) the connection bore (A) is charged with a pressurizing medium taking the form of compressed air or hydraulic oil from a not shown source of pressure medium. As a result a hydrostatic pressure is built up in the piston space (3.5) lying radially outwards from the cylindrical brake piston (3) and surrounding the latter as a ring, said piston space being situated axially between piston ring (8) (connected to the brake piston (3)) and insert ring (9) (provided at the opposing end face of the piston space). Said hydrostatic pressure counteracts the force of the spring elements (2) on the brake pistons (3) and on the guide rail (F) and thereby releases the clamping between the linear brake (LBR) and the friction surface (R) of the guide rail (F).

Essentially, the procedural steps represented in the description of FIG. 2 describe a so-called "Ruhebremse" (=a quiescent-current actuated spring pressure brake), which means that the linear brake (LBR) is applied without the application of external energy and is released only after the application of external energy, in this case in the form of hydrostatic pressure. Account is thereby taken of the so-called fail-safe principle, which means that upon failure of the applied external energy, here in the form of hydrostatic pressure, the linear brake (LBR) remains applied so that no uncontrolled movement arises between the linear brake (LBR) and the guide rail (F).

FIG. 3, which shows the Detail A excerpt from FIG. 2 illustrates in more detail the transfer of clamping force between the linear brake (LBR) and the guide rail (F). The force of the force store in the form of the spring elements (2) presses (upon release of pressure in the piston space (3.5)) the brake piston (3) in the direction of the guide rail (F), which brake piston straddles the guide rail (F) by way of the two fork-shaped piston ends (3.6). Through the interaction with the piston bevels (3.2) provided on the insides of the piston ends (3.6) with the corresponding wedge bevels (5.1) of the prismatically-formed transfer wedges (5), the force of the spring elements (2) is deflected radially inwards, intensified and directed by way of the wedge faces (5.2) of the two transfer wedges (5); the flexible transfer plate (6) and the clamping jaws (7) secured to the transfer plate (6) transmit said force laterally onto the friction surface (R) of the guide rail (F); here a clamping between the linear brake (LBR) and the guide rail (F) is affected.

In order to increase the efficiency and the clamping force as well as to lessen wear, as depicted, linear roller bearings can be positioned between the piston bevels (3.2) of the piston ends (3.6) and the wedge bevels (5.1) of the prismatic transfer wedges (5). These consist, respectively, of a bearing cage (4.1) and several roller elements (4.2), preferably cylindrical rollers. In place of roller elements being cylindrical rollers, of course, balls, tapered rollers or barrel-shaped rollers are also possible. As an alternative to the linear roller bearings (4) suitable plate-like plain bearing material can also be used between the piston bevels (3.2) and the wedge bevels (5.1).

One particular advantage of the use of the as described plate-shaped plain bearing material as opposed to linear roller bearings can be seen in the considerably lower costs as well as in the reduced effort in manufacture of the operative surfaces of the piston bevels (3.2) and the wedge bevels (5.1), which do not require a costly heat treatment.

The represented U-shaped transfer plate (6) performs several functions. On the one hand, it transfers in the direction of travel of the guide rail (F) the breaking forces without play from the clamping jaws (7) acting onto the friction surfaces (R) slack free to the brake housing (1) of the linear brake (LBR). By way of the represented securing screw (11) the transfer plate (6) can be attached to the linear brake. On the other hand, it serves as an elastic guide and mount for the clamping jaws (7) at right angles to the direction of movement of the linear brake (LBR) on the guide rail (F).

To perform these tasks, the transfer plate (6) can on the one hand be securely fastened to the clamping jaws (7) by way of adhesive, screws or welding and on the other hand exhibit a secure connection with the brake housing (1), for example, by way of screws, adhesive or welding. Suitable design of the transfer plate (6) and its connection to the clamping jaws (7) and the housing body (1.1) enables elastic movement of the clamping jaws (7) at right angles to the direction of movement between the linear brake (LBR) and the guide rail (F) and simultaneously ensures slack-free transfer of the braking force between the clamping jaws (7) and the brake housing (1) parallel to the direction of movement of the linear brake (LBR) on the guide rail (F). In the example represented in FIGS. 2 and 3, the transfer plate (6) is attached to the housing body (1.1) of the brake housing (1) with securing screws.

Furthermore, the transfer plate (6) can be arranged in an advantageous manner to have a suitable spring stiffness and pretension such that upon release of the linear brake (LBR) the clamping jaws (7) which are secured to the transfer plate (6) are gently lifted from the friction surfaces (R) of the guide rail (F) and thereby eliminate the need for a return spring.

In order to allow, for example with arising wear of the linear brake (LBR), precise adjustment of the braking effect, adjustment screws (10) are provided in threaded holes in the housing base (1.3). These press against the wide wedge ends (5.3) of the transfer wedges (5) and by way of the piston bevels (3.2) and the wedge bevels (5.1) enable an adjustment movement of the clamping jaws (7) against the friction surfaces (R) of the guide rail (F).

With the linear brake (LBR) according to the invention, high clamping forces are achieved on the friction surfaces (R) of the guide rail (F), which lead to large outwards-directed bending moments on the piston ends (3.6) of the piston (3). For this reason support bearings (12) composed of sliding material are provided in the housing bore (1.4) in the region of the piston ends (3.6), which divert the clamping forces away from the piston ends (3.6) onto the stable housing body (1.1) of the brake housing (1).

To increase the efficiency it is also conceivable that the sliding material of the support bearings (12) be replaced with a suitable roller bearing similar to that of the linear roller bearing (4).

FIG. 4 depicts Detail B from FIG. 2 showing further detail from the region of the pressure medium activated piston/cylinder arrangement for release of the linear brake (LBR). The clamping force for applying the linear brake (LBR) is provided by the spring elements (2) of the force store which, on the one hand, are supported by the housing lid (1.2) of the housing (1) and, on the other, exert a downwards as depicted in the drawing directed force on the brake pistons (3).

As is visible in FIG. 4, releasing of the linear brake (LBR) is provided by a piston/cylinder arrangement, which is essentially made up of the following components: housing body (1.1), brake pistons (3), piston ring (8) and backing ring (9) as well as the necessary seals. FIG. 4 shows as in the other figures the brake in a released state. This is to say that the piston space (3.5) is subjected to the necessary application of pressure so as to push the piston ring (8) against the force of the spring elements (2) of the force store against the underside of the housing lid (1.2).

The ring-shaped piston/cylinder arrangement is arranged concentrically with the spring elements (2) of the force store such that the spring elements (2) are spatially surrounded thereby. An advantageously low construction height of the housing (1) of the linear brake (LBR) according to the invention can thereby be achieved.

In order that, despite this concentric arrangement and compact construction, a large piston area is available for achieving the force necessary for release of the linear brake (LBR), the piston/cylinder arrangement is constructed as described in the following.

At its upper end in the region of the piston ledge (3.3) and the piston thread (3.4) the brake piston (3) has a reduced outside diameter in relation to the piston shank (3.1). Onto the piston thread (3.4) is screwed by way of a piston ring thread (8.1) the piston ring (8), which by way of the piston ring inside seal (8.2) is statically sealed against the brake piston (3) and by way of the piston ring outer seal (8.3) is dynamically sealed against the housing extension (1.5).

A support ring (9) is arranged in the annular piston space (3.5) formed between the piston ledge (3.3) and the housing ledge (1.6), which by way of the support ring inner seal (9.1) is dynamically sealed against the brake piston (3) and by way of the support ring outer seal (9.2) is statically sealed against the housing extension (1.5).

By way of the support ring (9) it is possible to sum the individual annular surfaces of the piston ledge (3.3) and the housing ledge (1.6) to achieve an effective active surface for the pressure medium found within the piston space (3.5) and thereby achieve a greater force against the spring elements (2) of the force store for releasing of the linear break (LBR).

To open the linear brake (LBR) a pressure medium is directed through the connection bore (A) into the piston space (3.5), which, by way of the piston ring active surface (8.4) and the equally large support ring active surface (9.3), produces the necessary force on the brake piston (3) to release the linear brake (LBR) against the force of the spring elements (2). This released state is shown in all the figures. The clamping jaws (7) are thereby loosened from the friction surface (R) of the guide rail (F) by an amount, which is practically invisible in the drawings.

In conclusion, FIG. 5 shows in longitudinal section of a preferred embodiment of the linear brake (LBR) according to the invention, from which longitudinal section it can be seen that in order to achieve larger clamping forces in the direction of movement of the linear brake (LBR) on the guide rail (F), it is possible to arrange several brake systems according to the invention in a row one behind another comprising force stores with spring elements (2) and piston/cylinder arrangements.

In the example implementation of FIG. 5 two brake systems are depicted in a row one behind the other. For simultaneous actuation of both brake systems arranged one behind the other by way of applied pressure medium, the annular piston spaces (3.5) are connected together with further connection bores (A).

Further, FIG. 5 shows the transfer plate (6) to be secured to the housing body (1.1) by way of fastening screw (11).

LIST OF REFERENCE SIGNS

A connection bore
LBR linear brake
F guide rail
R friction surface
1 brake housing
1.1 housing body
1.2 housing lid
1.3 housing base
1.4 housing bore
1.5 housing extension
1.6 housing ledge
2 spring element/force store
3 brake piston/ring piston
3.1 piston shank/piston skirt
3.2 piston bevel
3.3 piston ledge
3.4 piston thread
3.5 piston space 3.6 piston end
4 linear roller bearing
4.1 roller bearing cage
4.2 bearing body
5 transfer wedge
5.1 wedge bevel
5.2 wedge face
5.3 wedge end
6 transfer plate
7 clamping jaw
8 piston ring
8.1 piston ring thread
8.2 piston ring inner seal
8.3 piston ring outer seal
8.4 piston ring active surface
9 support ring/backing ring
9.1 support ring inner seal
9.2 support ring outer seal
9.3 support ring active surface
10 adjustment screw
11 securing screw
12 support bearing
14 cylindrical separation slot between piston shank 3.1 and housing body 1.1

The invention claimed is:

1. A linear brake for attachment on a slide that can be moved along a guide rail,
    with a brake housing which at least partly surrounds the guide rail,
    with a force store arranged in or on the brake housing,
    with a brake piston axially loaded by the force store, wherein axially protruding piston ends of said piston surround the guide rail in a fork-like manner,
    wherein the brake piston for braking/clamping purposes is movable at right angles to the direction of movement between the slide and the guide rail by way of the force store,
    wherein the piston ends of the brake piston are arranged on either side of the guide rail and exhibit opposing piston bevels which cooperate with wedge bevels which are provided on clamping jaws on either side of the guide rail, said clamping jaws being connected by a U-shaped transfer plate,
    wherein the clamping jaws, due to the pressing force of the force store onto the brake piston, are pressed against the guide rail,
    and wherein a piston space is disposed on the brake piston, which piston space by way of a connection bore is loaded with a pressure medium to work against the force of the force store and to affect a release of the linear brake,
    characterized in that
    the brake piston is configured as a cylindrical annular piston, which is loaded on one end face by the force store arranged centrally in the annular piston, and has on the other end face the piston ends with the bevel faces,
    and that the piston space is ring-shaped and is situated on the radial outside of the cylindrical ring piston in the region of the separation slot between the ring piston and the housing body,
    wherein the face side of the piston space is delimited by a piston ring attached radially outside the ring piston.

2. Linear brake according to claim 1, characterized in that the face of the piston space lying axially opposite the piston ring is formed of the piston ledge and the housing ledge, said ledges lying on either side of the separation slot.

3. Linear brake according to claim 1, characterized in that the face of the piston space lying axially opposite the piston ring is formed of the support/backing ring bridging both ledges which sums the areas of both ledges to a combined support ring effective surface to be impinged upon by the pressure medium of the piston space.

4. Linear brake according to claim 1, characterized in that the force store for activating the linear brake is composed of mechanical spring elements, preferably plate springs.

5. Linear brake according to claim 1, characterized in that linear roller bearings are arranged between the piston bevels and the wedge bevels.

6. Linear brake according to claim 1, characterized in that plain bearing elements are arranged between the piston bevels and the wedge bevels.

7. Linear brake according to claim 1, characterized in that in order to support the bending moments acting on the piston ends support bearings are disposed in the housing body.

8. Linear brake according to claim 7, characterized in that the support bearings arranged in the housing body are plain bearings.

9. Linear brake according to claim 7, characterized in that the support bearings arranged in the housing body are linear roller bearings.

10. Linear brake according to claim 1, characterized in that the wedge bevels are disposed on slidable transfer wedges and can be adjusted to compensate for slack and/or wear of the linear brake by way of an adjustment screw in the housing floor.

11. Linear brake according to claim 1, characterized in that several brake systems comprised of spring elements and piston/cylinder arrangements are arranged in a row one behind another in the movement direction of the linear brake on the guide rail.

12. Linear brake according to claim 1, characterized in that the transfer plate of the linear brake is construed with an elastic stiffness and implemented such that on the released linear brake the clamping jaws are held spring-loaded at a distance from the friction surfaces of the guide rail.

* * * * *